United States Patent
McLaughlin

[11] Patent Number: 5,993,003
[45] Date of Patent: Nov. 30, 1999

[54] AUTOSTEREO PROJECTION SYSTEM

[75] Inventor: Joseph L. McLaughlin, Marblehead, Mass.

[73] Assignee: Litton Systems, Inc., Woodlands Hills, Calif.

[21] Appl. No.: 09/003,614

[22] Filed: Jan. 7, 1998

Related U.S. Application Data

[60] Provisional application No. 60/042,424, Mar. 27, 1997.

[51] Int. Cl.[6] .................................................. G03B 21/14
[52] U.S. Cl. .............................. 353/7; 359/462; 348/52
[58] Field of Search ................................ 353/7, 10, 30, 353/94; 359/462, 464, 470, 475, 478; 348/48, 46, 47, 51, 52, 55, 56, 742, 743

[56] References Cited

U.S. PATENT DOCUMENTS

| | | | |
|---|---|---|---|
| 4,799,739 | 1/1989 | Newswanger . | |
| 4,853,769 | 8/1989 | Kollin | 358/88 |
| 5,132,839 | 7/1992 | Travis | 359/462 |
| 5,223,925 | 6/1993 | Hattori | 358/88 |
| 5,283,640 | 2/1994 | Tilton | 348/42 |
| 5,392,140 | 2/1995 | Ezra et al. | 359/41 |
| 5,430,474 | 7/1995 | Hines | 348/42 |
| 5,465,175 | 11/1995 | Woodgate et al. | 359/463 |
| 5,495,576 | 2/1996 | Ritchey | 395/125 |
| 5,521,724 | 5/1996 | Shires | 359/22 |
| 5,543,964 | 8/1996 | Taylor et al. | 359/462 |
| 5,546,120 | 8/1996 | Miller et al. | 348/59 |
| 5,568,314 | 10/1996 | Omori et al. | 359/464 |
| 5,614,941 | 3/1997 | Hines | 348/42 |
| 5,825,540 | 10/1998 | Gold et al. | 359/462 |
| 5,855,425 | 1/1999 | Hamagishi | 353/7 |

FOREIGN PATENT DOCUMENTS

| | | |
|---|---|---|
| 0656555 A1 | 6/1995 | European Pat. Off. . |
| 0752609 A2 | 1/1997 | European Pat. Off. . |

OTHER PUBLICATIONS

Travis, A.R.L., et al., "The Design and Evaluation of a CRT–Based Autostereoscopic 3–D Display," *Proceedings of the SID*, 32(4) :279–283, (1991).

Travis, A.R.L., "Panoramic 3D Video," ICAT 94, Toyko, pp. 229–235, Jul. 14–15, 1994.

Travis, A.R.L., et al., "Time–Manipulated Three–Dimensional Video," 4 pgs.

Travis, A.R.L., "Autostereoscopic 3–D Display," *Applied Optics*, 29(29) :4341–4343, (1990).

Lang, S.R., et al., "A 2nd Generation Autostereoscopic 3–D Display," pp. 1–11.

"NHK Broadcast Technology Lab —New Autostereo System with 4 Views," (English Translation), comprising 3 pages, Jul. 7, 1996.

Hoshino, H., et al., "Multi–Viewpoint 3D Display With Time–Divided Backlighting System," comprising 14 pages.

*Primary Examiner*—William Dowling
*Attorney, Agent, or Firm*—Hamilton, Brook, Smith & Reynolds, P.C.

[57] ABSTRACT

An autostereo projection system uses multiple projectors to form a seamless and extended field of view. Each projector is registered to a CRT display. Shutter elements in each projector create multiple pupils for each CRT display. Each CRT display is driven with different images for each shutter pupil.

32 Claims, 3 Drawing Sheets

AUTOSTEREO PROJECTION SYSTEM

RELATED APPLICATIONS

This application claims priority to U.S. Provisional Application No. 60/042,424 filed on Mar. 27, 1997.

BACKGROUND OF THE INVENTION

Three-dimensional displays are used to create an illusion of a three-dimensional image to a viewer by displaying a different two-dimensional image to each eye of the viewer. Each view is taken at a slightly different angle so the viewer perceives the illusion of a three-dimensional scene. Such three-dimensional display systems are preferred for virtual reality and gaming applications.

One example of a three-dimensional display employs a movable vertical slit in combination with an image source. The slit is moved between a plurality of positions in sequence with images displayed by the image source. The images can be viewed by a viewer with each image displaced in space based on the position of the slit.

SUMMARY OF THE INVENTION

Although prior art systems can provide a stereoscopic image to a viewer, they have a number of significant limitations. Such systems suffer from low image brightness, a narrow field of view, a small number of pupil slices, and a small image size. Although any one of these deficiencies could be improved using prior art techniques, such improvement would be at the expense of severe degradation of the other considerations.

In accordance with preferred embodiments of the invention, a three-dimensional display device includes a multiple pupil, multiple projection system which has its pupils abutted as close together as possible. Each projection system simultaneously images a respective image from an image source onto a viewing optic. The viewing optic can include a Fresnel lens or a concave mirror in a folded system. The viewing optic images the pupil of the projection lenses onto a continuous array of viewing ports at a viewing space. Such a system provides a brighter, multiple view display with a wide viewing space projection.

In accordance with a first aspect of the invention, a display device includes a plurality of image sources and an image space having a plurality of discrete views. Each image source displays a plurality of sequential images of an object. Each view is optically coupled to a respective sequential image of the object.

A multi-projection optical system is preferably used to couple the views to the sequential images. The multi-projector optical system includes a plurality of projector lens assemblies, each registered to a respective image source. A plurality of addressable shutters are registered to each projector lens assembly. A common viewing assembly is registered to the projector lens assemblies to provide the multiple views.

Preferably, a controller is coupled to the image sources and the shutter elements. Each image source provides a respective view of a scene at a specific time. The shutters are arranged such that there are a plurality of slits optically aligned with each image source. The controller operates the image sources and the shutters to form a plurality of simultaneous images. A viewer views two of these images at a time.

The above and other features of the invention, including various novel details of construction and combination of parts, will be more particularly described with reference to the accompanying drawings and pointed out in the claims. It will be understood that the particular embodiments of the invention are shown by illustration only and not as a limitation of the invention. The principal and features of this invention may be embodied in varied and numerous embodiments without departing from the scope of the invention.

DETAILED DESCRIPTION OF PREFERRED EMBODIMENTS OF THE INVENTION

Figure 1:
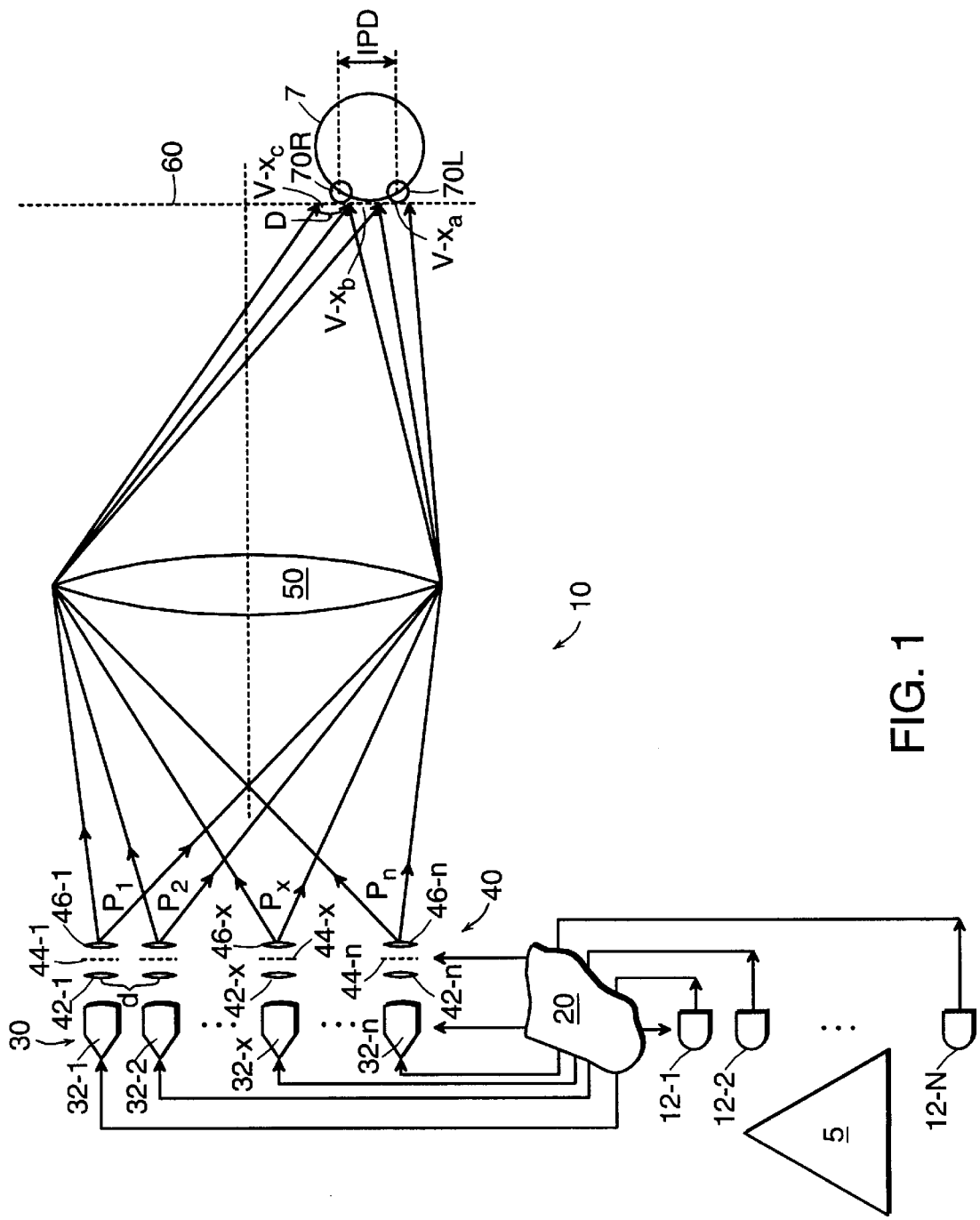
FIG. 1 is a schematic block diagram of an autostereoscopic display device in accordance with a preferred embodiment of the invention.

FIG. 1 is a schematic diagram of a preferred autostereoscopic projection system in accordance with a preferred embodiment of the invention. In one embodiment, views of an object 5 are captured by an imaging system 10. Typically, the imaging system 10 includes an array of still or video cameras 12-1, 12-2, ... , 12-N. The captured images are provided to a control system 20, which can control the cameras 12. In another embodiment, the views are computer generated and the control system 20 includes a computer.

The control system 20 provides video signals to an imaging system 30. Preferably, the imaging system 30 comprises an array of image sources 32-1, 32-2, ... , 32-x, ... , 32-n, which can be cathode ray tube (CRT) or liquid crystal display devices. The image sources 32 also receive control signals from the control system 20.

A projection system 40 is optically coupled to the imaging system 30. In particular, the projection system 40 includes a plurality of projection subsystems 40-1, 40-2, ... , 40-x, ... , 40-n which are each coupled to a respective image source 32-1, 32-2, ... , 32-x, ... , 32-n. As will be described in greater detail below, each projection subsystem 40-x includes a first projection lens 42-x, a shutter element 44-x and a second projection lens 46-x. The shutter element 44-x is a spatial light modulator which includes a moveable slit controlled by the control system 20. Preferably, the shutter element 44-x is a liquid crystal device and the slit is a vertical light modulating cell which can be selected from about 5–8 vertically arranged positions in the shutter element 44-x. Alternatively, the light modulating cell can be selected from a plurality of two-dimensionally arranged windows in the shutter element 44-x.

In operation, the control system 20 controls the image source 32-x and the respective shutter element 44-x such that a different video frame is provided on the display 32-x for each slit position in the shutter element 44-x. In particular, the video frames are time-multiplexed in step with the shutters. In that way, there are plurality of pupils created for each image source 32.

For a particular frame of an image source 32-x, the projection system 40-x projects an image projection P-x to a common viewing optic 50. In accordance with one aspect of the invention, the viewing optic 50 is a Fresnel lens. The viewing optic 50 focuses the image onto a virtual exit pupil or viewing port V-$X_a$ on an imaging plane 60. This viewing port V-$X_a$ provides a view of the frame image on the image source 32-x.

At any one time, the viewing optic 50 provides the views from the selected pupil of each image source 32 to an viewing space 60 for viewing by a viewer 7 or a plurality of viewers. Each viewer 7 maintains the left eye 70L and the right eye 70R in the viewing space. The eyes are spaced apart by an intra-pupillary distance (IPD). As shown, there an a plurality of viewing ports at the imaging plane 60, each providing a view of a respective video frame of a respective image source. The optics are optimized so the views of the slits at the viewing space 60 abut each adjacent view and are spaced apart by a distance D on center. To promote seamless viewing, where the images appear continuous as the viewer's head moves, the distance D is preferably less than or equal to one-half the IPD. Typically, the slits are between 22–25 mm wide at the viewer's eye. As such, blackened areas of the image at the viewer are substantially eliminated.

Each eye 70L, 70R sees a different image source 32 to create an illusion of three-dimensional objects. In addition to seamless viewing, the optical system 1 provides extended viewing through many viewing ports. To maximize the field of view, the lens array is as large as practical. For example, in accordance with a preferred embodiment of the invention, the optical system has a focal ratio of f/1 and is dimensioned to be equivalent to a 25-inch diagonal monitor. To minimize the dimensions of the device, a folded optical system having a concave mirror is preferably utilized for the viewing optics 50.

Figure 2:
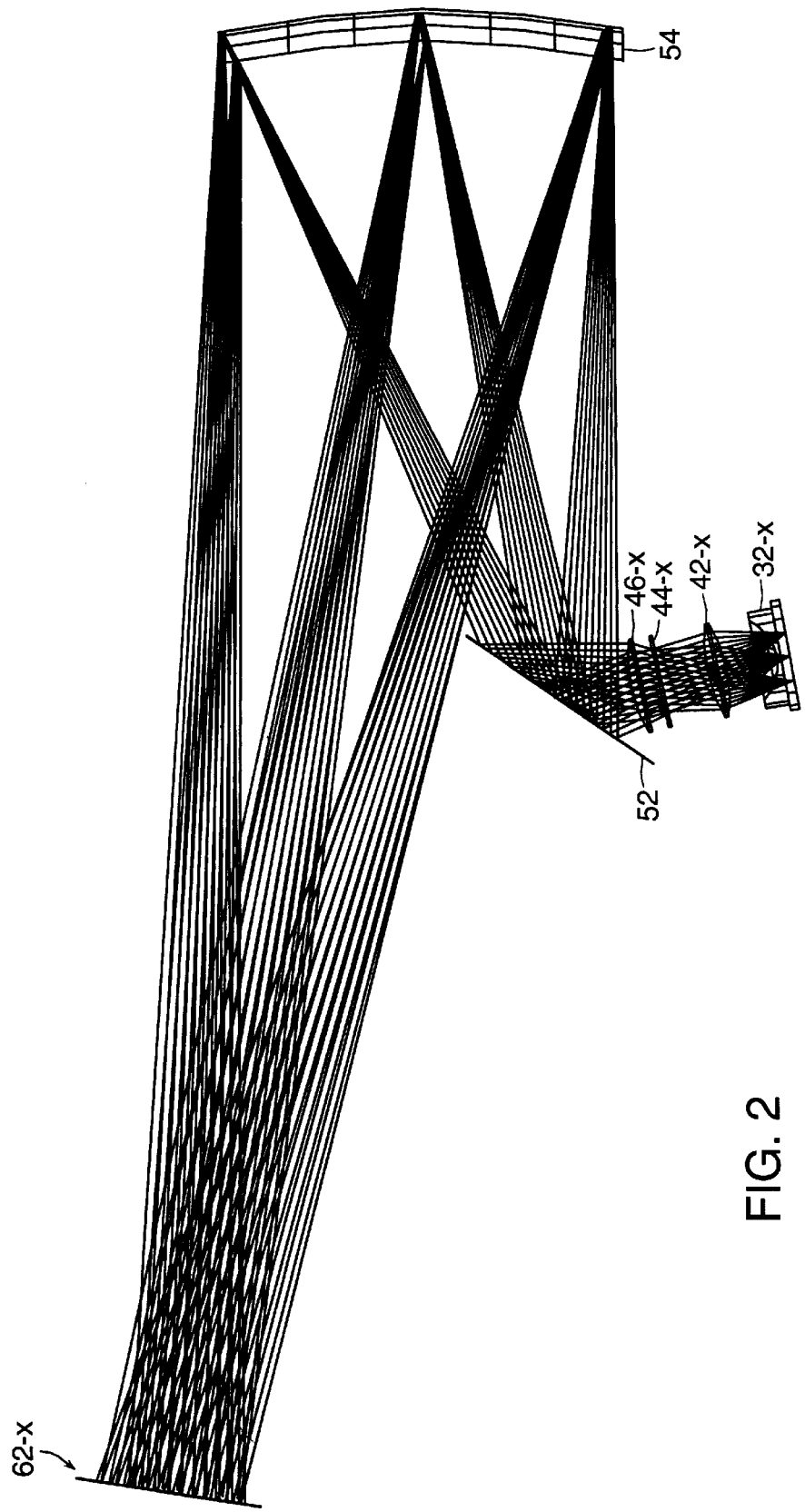
FIG. 2 is a schematic diagram of a preferred viewing optic 50 of FIG. 1.

FIG. 2 is a schematic block diagram of a preferred viewing optic 50 of FIG. 1. As illustrated, the viewing optic 50 includes a planar mirror 52 and a concave mirror 54. Although only one planar mirror 52 is illustrated, it will be understood that each projection subsystem can have a respective planar mirror. Light from the projection subsystem 40-x is reflected by the planar mirror 52 onto the concave mirror 54. The concave mirror 54 operates as a viewing screen, focusing the light onto the respective viewing ports. By employing mirrors, the optical path can be folded to increase the focal length of the system while maintaining a relatively compact size.

Figure 3:
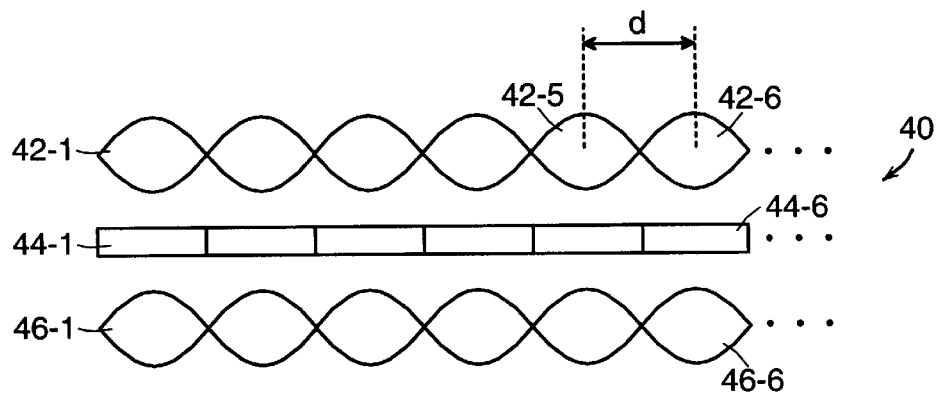
FIG. 3 is a schematic diagram of the projection lens array 40 of FIG. 1.

FIG. 3 is a schematic diagram of the projecting system 40 of FIG. 1. As illustrated, each first projection lens 42 and second projection lens 46 directly abut adjacent lenses. In accordance with a preferred embodiment of the invention the lenses are fabricated by molding the lenses from a sheet of plastic. Each lens is registered to a plurality of independently addressable shutters.

Figure 4:
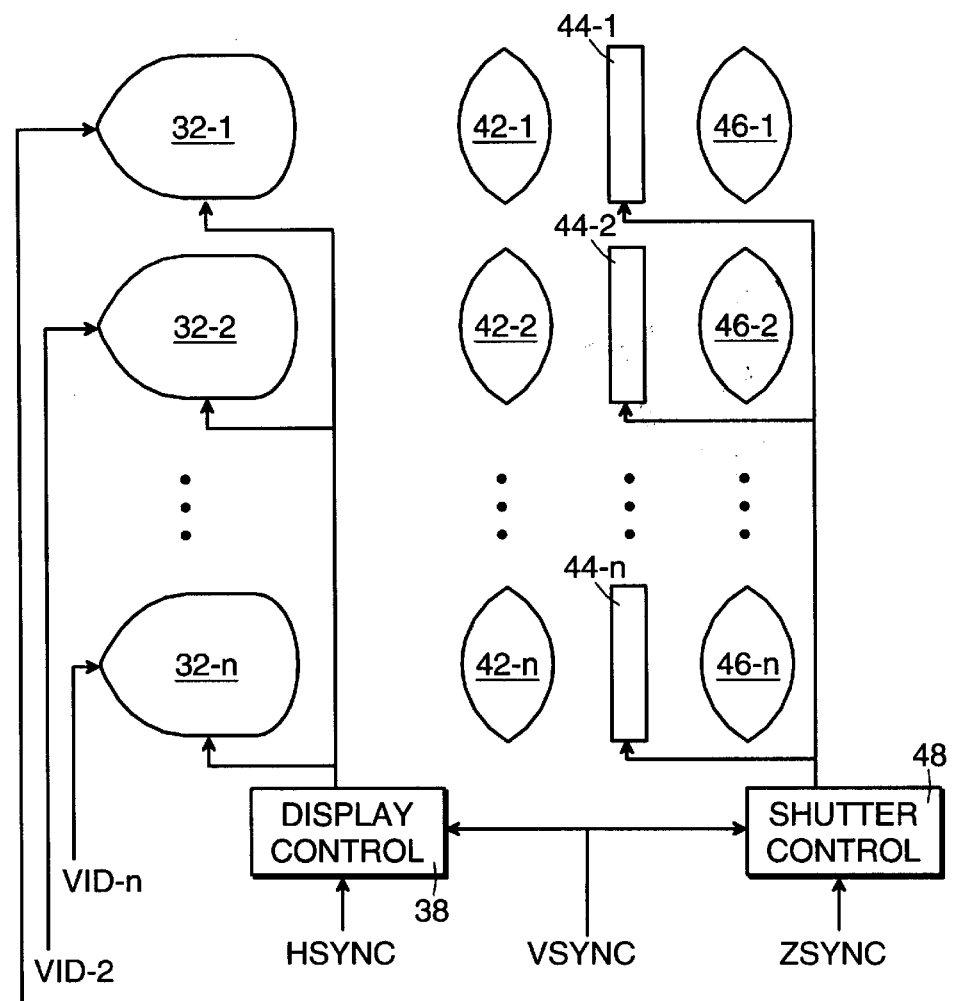
FIG. 4 is a schematic block diagram of the control system for operating the autostereoscopic display device of FIG. 1.

FIG. 4 is a schematic block diagram of a control system in accordance with the invention. As shown, a plurality of video signals VID-1, VID-2, VID-n are received from the control system 20 and provided to respective image sources 32-1, 32-2, . . . , 32-n. In addition, horizontal synchronization (H-sync), vertical synchronization (V-sync), and video field synchronization (Z-sync) signals from the control system 20 are received by control circuitry. A display control module 38 receives the H-sync and V-sync signals to drive the image sources 32. A shutter control module 48 receives the V-sync and Z-sync signals and drives the shutter elements 44. The V-sync signal is used to synchronize the video frames of the image sources 32 with the slits in the shutter elements 44.

Although not shown, a separate red, green, blue (RGB) shutter element can be placed over each image source 32. These color shutter elements are preferably used to sequentially create a color video frame from a monochrome image. The display control module 38 can be modified to operate the color shutter elements.

EQUIVALENTS

Those skilled in the art will know, or be able to ascertain using no more than routine experimentation, many equivalents to the specific embodiments of the invention described herein. These and all other equivalents are intended to be encompassed by the following claims.

We claim:

1. An apparatus for displaying a three-dimensional view of an object, comprising:
   a plurality of image sources, each image source displaying a plurality of sequential images of an object;
   a viewing space having a plurality of discrete views, each view optically coupled to a respective sequential image of the object;
   a plurality of projector lens assemblies, each projector lens assembly registered to a respective image source;
   a plurality of addressable shutters registered to each projector lens assembly; and
   a viewing assembly registered to the projector lens assemblies.

2. The apparatus of claim 1 further comprising a plurality of spatial light modulators, each spatial light modulator comprising a plurality of light modulating cells and coupled to a respective image source.

3. The apparatus of claim 2 further comprising a control unit coupled to each image source and each spatial light modulator, the control unit operating the light modulating cells in sequence with the sequential images.

4. The apparatus of claim 1 further comprising a Fresnel lens optically disposed between the image sources and the viewing space.

5. The apparatus of claim 1 wherein the viewing space provides extended viewing of the image sources to a plurality of viewers.

6. The apparatus of claim 1 wherein the viewing space provides seamless viewing of the image sources as a viewer moves from a first position to a second position in the viewing space.

7. The apparatus of claim 2 wherein the spatial light modulators include a liquid crystal device.

8. The apparatus of claim 1 wherein the viewing assembly is common to each discrete view.

9. The apparatus of claim 1 wherein the images rendered at each discrete view has a refresh rate suitable for an observer to perceive a continuous image.

10. The apparatus of claim 1 wherein the viewing assembly is common to the image sources.

11. An apparatus for displaying a three-dimensional view of an object, comprising:
    a plurality of image sources, each image source displaying a selected video frame at a selected time;
    a multi-projector optical system for projecting light from each selected video frame of each image source to a respective viewing position in a viewing space;
    a plurality of projector lens assemblies, each projector lens assembly registered to a respective image source;
    a plurality of addressable shutters registered to each projector lens assembly; and
    a viewing assembly registered to the projector lens assemblies.

12. The apparatus of claim 11 wherein the viewing assembly comprises a Fresnel lens.

13. The apparatus of claim 11 wherein the viewing assembly comprises a mirror.

14. The apparatus of claim 11 wherein the addressable shutters include color shutter elements.

15. The apparatus of claim 11 wherein the viewing space includes a two-dimensional array of viewing positions.

16. The apparatus of claim 11 wherein the viewing assembly is common to each viewing position.

17. The apparatus of claim 11 wherein the viewing assembly is common to the image sources.

18. A method for displaying a three-dimensional view of an object, the method comprising:

providing a plurality of image sources, each image source displaying a plurality of sequential images of an object;

optically coupling a viewing space having a plurality of discrete views to a respective sequential image of the object;

providing a plurality of projector lens assemblies, each projector lens assembly registered to a respective image source;

registering a plurality of addressable shutters registered to each projector lens assembly; and registering a viewing assembly to the projector lens assemblies.

19. The method of claim 18 further comprising providing a plurality of spatial light modulators, each spatial light modulator comprising a plurality of light modulating cells; and coupling each spatial light modulator to a respective image source.

20. The method of claim 19 further comprising:

coupling a control unit to each image source and each spatial light modulator; and from the control unit, operating the light modulating cells in sequence with the sequential images.

21. The method of claim 18 further comprising optically disposing a Fresnel lens between the image sources and the viewing space.

22. The method of claim 18 wherein the viewing space provides extended viewing of the image sources to a plurality of viewers.

23. The method of claim 18 wherein the viewing space provides seamless viewing of the image sources as a viewer moves from a first position to a second position in the viewing space.

24. A method for displaying a three-dimensional view of an object, the method comprising:

providing a plurality of image sources;

from each image source, displaying a selected video frame at a selected time;

from a multi-projector optical system, projecting light from each selected video frame of each image source to a respective viewing position in a viewing space;

providing a plurality of projector lens assemblies, each projector lens assembly registered to a respective image source;

registering a plurality of addressable shutters registered to each projector lens assembly; and registering a viewing assembly to the projector lens assemblies.

25. The method of claim 24 wherein the viewing assembly comprises a Fresnel lens.

26. The method of claim 24 wherein the viewing assembly comprises a mirror.

27. The method of claim 24 wherein the addressable shutters include color shutter elements.

28. The method of claim 24 wherein the viewing space includes a two-dimensional array of viewing positions.

29. The method of claim 19 wherein the spatial light modulators include a liquid crystal device.

30. The method of claim 24 wherein the viewing assembly is common to each viewing position.

31. The method of claim 24 wherein the viewing space provides seamless viewing of the image sources as a viewer moves from a first position to a second position in the viewing space.

32. The method of claim 24 wherein displaying comprises rendering the images at each view port at a refresh rate suitable for the observer to perceive a continuous image.

* * * * *